(12) United States Patent
Bader

(10) Patent No.: US 7,083,034 B2
(45) Date of Patent: Aug. 1, 2006

(54) SHIFT APPARATUS

(75) Inventor: Josef Bader, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 127 days.

(21) Appl. No.: 10/841,899

(22) Filed: May 7, 2004

(65) Prior Publication Data
US 2004/0226799 A1  Nov. 18, 2004

(30) Foreign Application Priority Data
May 13, 2003  (DE) ................. 103 21 280

(51) Int. Cl.
*F15B 15/22* (2006.01)
(52) U.S. Cl. .............. 192/86; 192/87.14; 192/109 F
(58) Field of Classification Search ............. 192/86, 192/87.14, 109 F; 91/399, 401
See application file for complete search history.

(56) References Cited

U.S. PATENT DOCUMENTS

| | | | |
|---|---|---|---|
| 3,608,433 A * | 9/1971 | Buisman et al. ........... 91/401 |
| 3,896,703 A * | 7/1975 | Bertanza .................. 91/401 |
| 4,565,115 A * | 1/1986 | Bacardit ................. 91/375 A |
| 4,986,404 A * | 1/1991 | Kajitani et al. ........... 192/109 F |
| 6,405,845 B1 * | 6/2002 | Muller et al. ............ 192/30 V |

FOREIGN PATENT DOCUMENTS

| | | |
|---|---|---|
| DE | 2 151 194 | 4/1973 |
| DE | 195 43 646 A1 | 5/1997 |
| DE | 196 04 516 A1 | 8/1997 |

* cited by examiner

*Primary Examiner*—Saul Rodriguez
(74) *Attorney, Agent, or Firm*—Davis & Bujold, P.L.L.C.

(57) ABSTRACT

A gear shift device (2) for a motor vehicle comprises one cylinder (4) loaded with a pressure medium. Situated in said gear shift cylinder (4) is one gear shift piston (12) which divides the gear shift cylinder (4) into two working chambers (22, 24) and has one aperture (30) adequate to allow an exchange of pressure medium between the two working chamber (22, 24). In the gear shift cylinder (4) is provide one axially fixed bolt (26) which protrudes through at least one aperture (30) in the gear shift piston (12). The bolt (26) has a diameter which is not constant over the length of the bolt (26) and interacts with at least one aperture (30) in the gear shift piston (12) to form sealing points.

5 Claims, 3 Drawing Sheets

SHIFT APPARATUS

This application claims priority from German Application Serial No. 193 21 280.9 filed May 13, 2003.

FIELD OF THE INVENTION

The invention concerns a gear shift device.

BACKGROUND OF THE INVENTION

Modern motor vehicle, gear shift systems and especially in pneumatically shifted industrial vehicle transmissions, have gear shift devices that comprise pistons and cylinders. The cylinders are, in particular, used for additional auxiliary transmissions which can be provided in the form of splitter or group transmissions, or also a combination of both transmissions. Splitter transmissions, usually front-mounted on a main transmission, divide the ratio steps between two gear steps in the main transmission while group transmissions, usually rear-mounted on a main transmission, enlarge the total spreading action of the ratio of the main transmission. For this purpose, group transmissions are often designed in the form of planetary transmissions.

In the auxiliary transmissions, the gear shift is effected via the pistons disposed in the respective cylinder which, for the purpose, is connected with the gear shift element to be engaged via a rod. Gear shift elements are usually considered synchronized gear shift elements. Synchronous total shifting times as short as possible are to be sought in the gear shifting operations. For this reason and to obtain an acceptable cold shifting characteristic, the work is carried out under high system pressure with adequately dimensioned cylinders. As a consequence of this, when the piston strikes a fixed stop surface, high dynamic forces appear in the cylinder which cause loud gear shift noises which are felt to be disturbing.

The gear shift noises and the strong impact force of the piston are to be attributed to the fact that during the synchronization operation of the transmission the piston is locked directly before its end stop but later on is loaded with the full pressure of the pressure medium so that after unlocking of the synchronizer device, with the force produced by the prestress, the selector teeth slash against each other or the piston impinges upon end stops in the cylinder.

Together with loud impact noises, the stabilization and durability of gear shift elements deteriorate under the forceful impact of the piston which can result, for example, in breakages on the gear shift fork or on the cylinder cover, to loosening of the gear shift fork connection or to failure of electronic parts.

Different means are known from the practice to attenuate the end impact of the piston in the cylinder.

The Applicant's DE 196 04 516 A1 describes a pneumatic gear shift device for a range change group gear shift which, with all its contents must also be the object of this application. The pneumatic gear shift device is furnished with a piston which in a cylinder separates from each other two working chambers. The cylinder is connected via compressed-air lines with a reversing valve for control of a compressed-air current. Between the reversing valve and the cylinder, a control valve is intercalated with a control piston and, depending on the differential pressure of the working chambers, the compressed air lines in the cylinder can be locked by the control valve. At the same time at the end of a synchronization operation, the compressed air of the working chambers of the cylinder pressurized by the piston is shut off and a residual air cushion remains therein to attenuate the end impact of the piston on a front or stop side in the cylinder. This kind of counter ventilation has not proved sufficient. Together with the expensive arrangement, the reaction time of the counter ventilation is too long.

The Applicant's DE 195 43 646 A1 has disclosed a gear shift device having one pneumatic auxiliary force for a group gear shift in which in one cylinder one piston is, likewise provided which separates two working chambers from each other. In the piston is located one shift valve which, depending on the pressurization, can be moved longitudinally relative to the longitudinal axle of the cylinder and which, upon a minimal defined volume of one of the working chambers between the piston and corresponding stop surface, impinges upon the stop surface. At the same time, the slide valve moves in a direction opposite to the direction of motion of the piston and allows a through flow of pressure medium through the piston from the pressurized working chamber to the working chamber lying in the direction of motion of the piston. This gear shift device is not sufficiently capable to break down the prestress built up during the synchronization in order to obtain an effective attenuation of the impact of the piston.

The problem in which the invention is based is to propose a gear shift device in which the impact attenuation of the shift piston is improved.

The problem is solved with a gear shift device having the characteristic features of claim 1. Developments are objective of sub-claims.

SUMMARY OF THE INVENTION

The inventive gear shift device for a motor vehicle comprises one cylinder loaded with pressure medium and one piston in the cylinder which divides the cylinder into two working chambers. The piston has at least one aperture suitable to allow an exchange of pressure medium between the two working chambers. Provided in the cylinder is one axially fixed bolt which protrudes through at least one aperture suitable to allow an exchange of pressure medium between the two working chambers. One axially fixed bolt in the cylinder is provided which protrudes through at least one aperture in the piston. The diameter of the bolt is not constant over the length of the bolt and it interacts with at least one aperture in the piston to form sealing points.

The bolt preferably has three areas in which the diameter is designed so as to form one sealing point with at least one aperture in the piston.

In an advantageous development, two of the three areas lie on end positions of the piston and the third area lies between the two areas.

Likewise an advantageous development of the invention shows the diameter of the bolt in such a manner that it decreases from the two areas on the end positions of the piston toward the third area continuously or also differently, for example.

In a specially preferred embodiment, the piston has two apertures through which the bolt protrudes. Each of the two apertures in the piston preferably interacts here, to form a sealing point, either with one area of the bolt on an end position of the piston or the aperture interacts with the third area of the piston which lies between the areas on the two end positions.

Preferably one aperture is located in the piston in the third area of the bolt when the gear shift device is in a synchronization phase of the ratio to be precisely engaged.

BRIEF DESCRIPTION OF THE DRAWINGS

The invention will now be described, by way of example, with reference to the accompanying drawings in which.

DETAILED DESCRIPTION OF THE INVENTION

Figure 1:
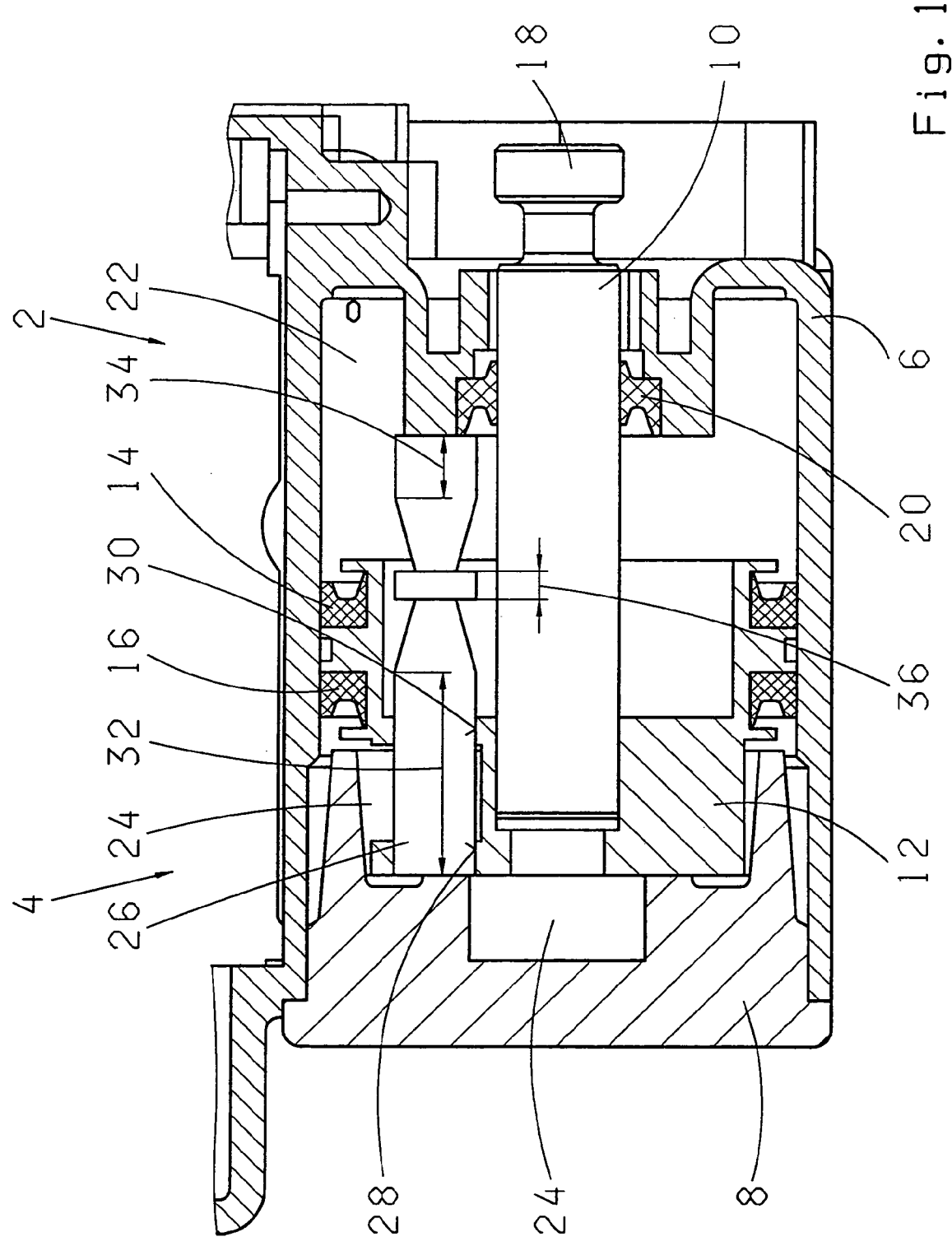
FIG. 1 shows a section through the gear shift device in a gear shifting position.

FIG. 1 shows a gear shift device 2 for a transmission not specifically designated here. The gear shift device 2 has one gear shift cylinder 4 formed by a gear shift cylinder sleeve 6 and a gear shift cylinder cover 8. Within the gear shift cylinder 4, on one gear shift rod 10 is fastened one gear shift piston 12 which is provided with seals 14 and 16 and which snugly slides along on the inner wall of the gear shift cylinder sleeve. Provided on the gear shift rod 10 is one flange 18 which connects the gear shift rod 10 with other parts (not shown) of the gear shift device 2. Within the gear shift cylinder sleeve 6 slides the gear shift rod 10 in one seal 20 which seals a first working chamber 22 in relation to the environment. The first working chamber 22 is formed within the gear shift cylinder 4 between the seal 14 on the gear shift piston 12 and the seal 20 in the gear shift cylinder sleeve 6. On the opposite side of the gear shift piston 12, between the gear shift cylinder cover 8 and the seal 16, a second working chamber 24 is formed on the gear shift piston 12.

Between the gear shift cylinder sleeve 6 and the gear shift cylinder cover 8 is situated an axially fixed bolt 26. The gear shift piston 12 has two apertures 28 and 30 through which the bolt 26 protrudes. The area of the gear shift piston 12 between the two apertures 28 and 30 is exposed and forms one part of the working chamber 24. In the end position of the gear shift piston 12 (shown in FIG. 1), the outer diameter of the bolt 26 corresponds in this area 32 of the bolt 26 substantially to the inner diameter of the apertures 28 and 30 so that the bolt 26 and the apertures 28 and 30 interact forming sealing points.

Figure 3:
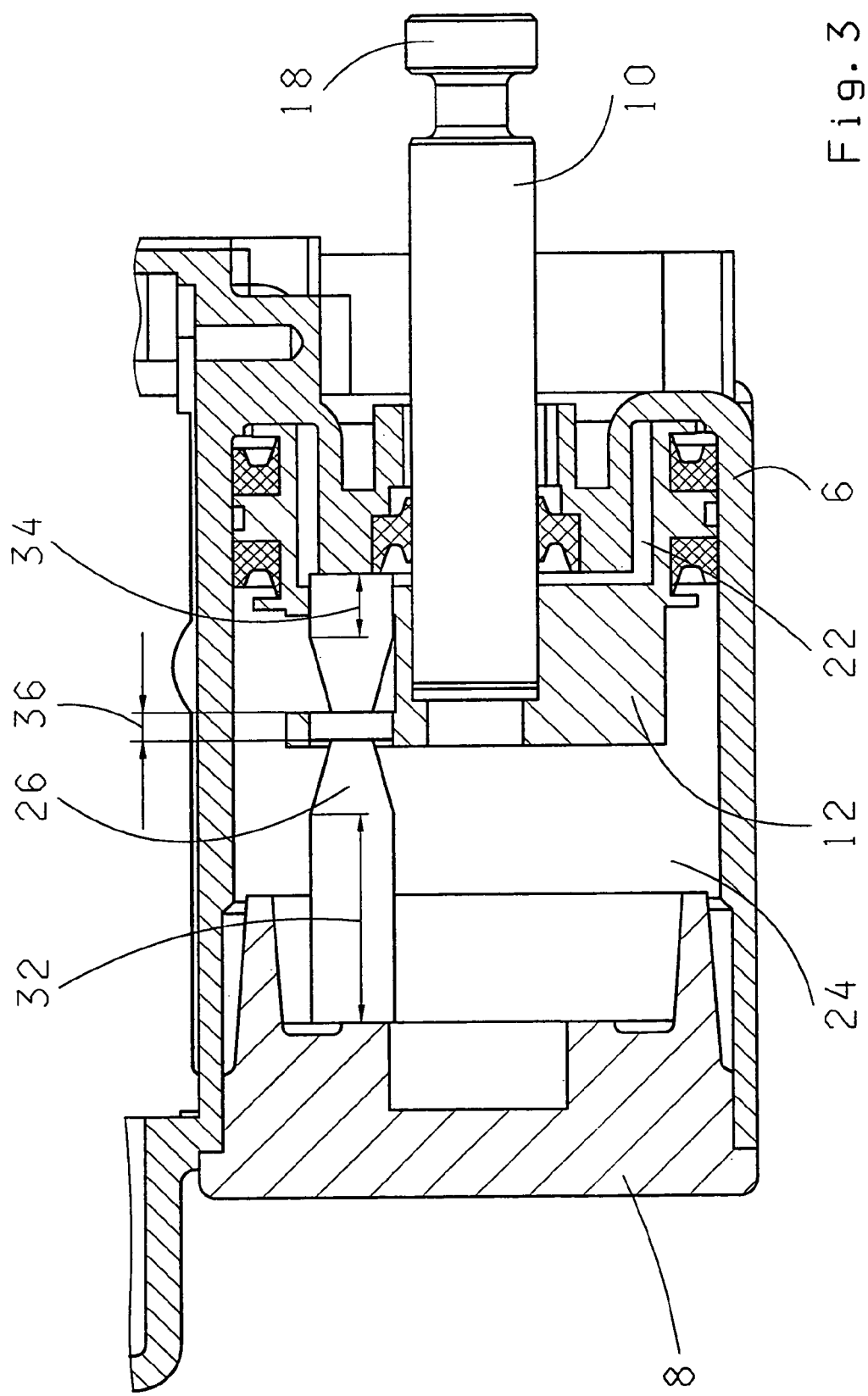
FIG. 3 shows a section through the gear shift device in a second gear shift position.

The bolt 26 has a second area 34 where the diameter of the bolt 26 corresponds to the diameter in the area 32. In the area 32 the aperture 30 of the piston interacts with the bolt 26 to form a sealing point when the gear shift piston 12 substantially takes in the other end position in the cylinder 4, as shown in FIG. 3. Between the two areas 32 and 34, the bolt 26 has a third area 36 in which the diameter of the bolt 26 corresponds to the diameter in the areas 32 and 34.

Between the area 32 and the area 36, the same as between the second area 34 and the area 36, the diameter of the bolt 26 continuously diminishes toward the area 36. Thereby the area of the bolt 26 no longer interacts with the apertures 28 and 30 to form a sealing point and the pressure medium existing in the gear shift cylinder can reach from one working chamber 22, 24 to the other working chamber 24, 22.

Figure 2:
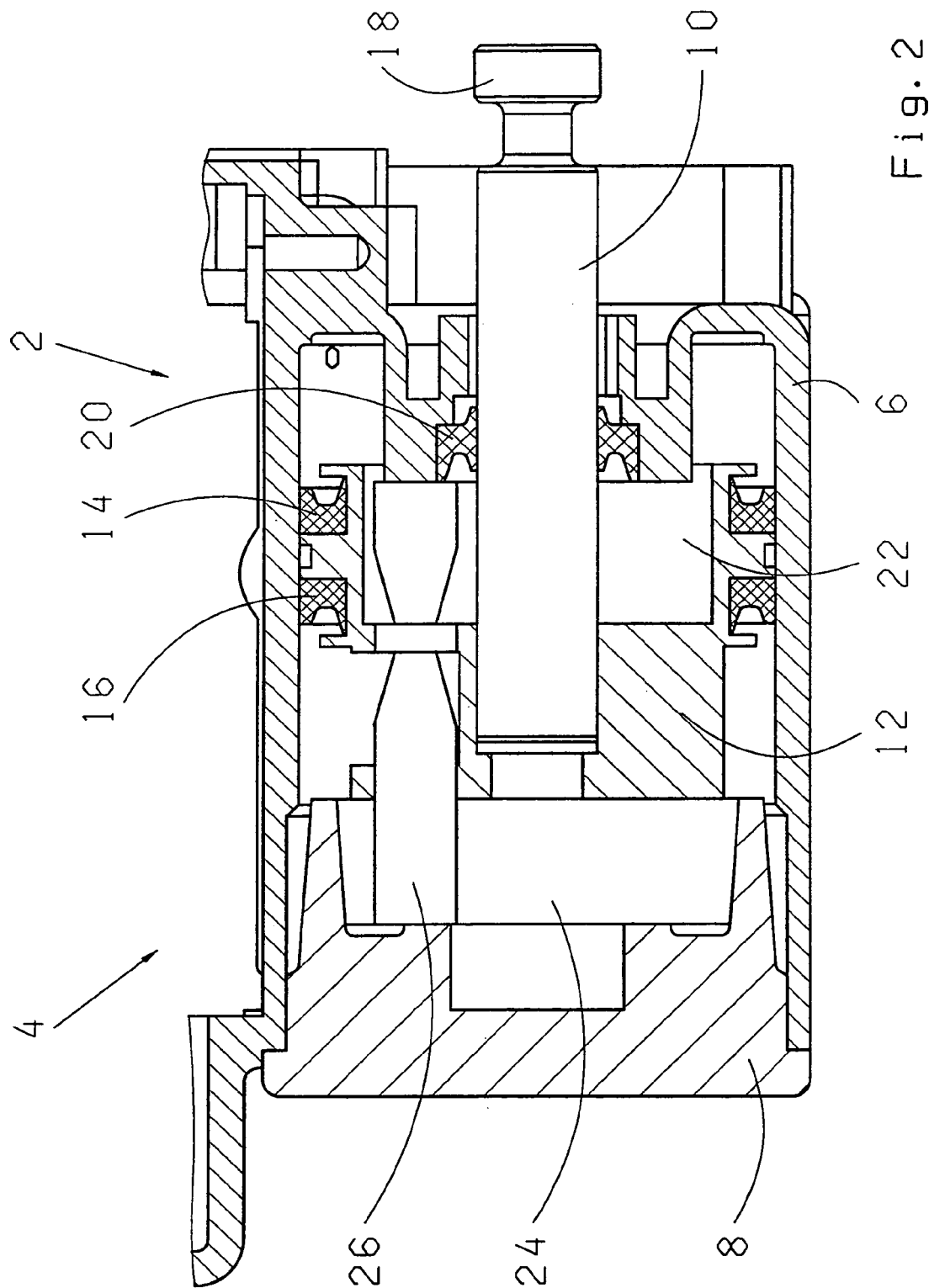
FIG. 2 shows a section through the gear shift device in a synchronization phase.

During an engagement, the following shifting cycles result in the gear shift device 2. The gear shift piston 12 is first in its left position, as shown in FIG. 1. For movement of the gear shift rod 10 to the right in the drawing plane, a pressure medium is fed to the working chamber 24 via a line (not shown here). Thereby the piston 12 is moved to the right thus moving the gear shift rod 10 to the right. The seals 14 and 16 seal the gear shift piston in the gear shift cylinder sleeve 6 and next also seal the aperture 30 in the area 32 of the bolt 26. When the gear shift piston 12 is moved to the right far enough for the aperture 30 in the area 32 to abandon the area 32 in the bolt 26, the pressure medium on the bolt 26 flows past and out of the working chamber 24 to the working chamber 22. But the pressure upon the gear shift piston 12 in the working chamber 24 remains higher than the pressure in the working chamber 22. This gear shift piston 12 moves farther to the right until the aperture 30 arrives at the area 36 of the bolt 26. This situation is shown in FIG. 2.

In a synchronization phase a shifting element (not shown here) to be engaged by the gear shift device 2 is in this situation. At the same time for compensation of different rotational speeds of parts to be connected, a friction of the parts in relation to each other is produced and a connection of the parts is eliminated and locked until the compensation of the rotational speeds has been accomplished. Thereafter the locking action is released and the parts to be connected can be connected.

To achieve the friction effect, the pressure in the gear shift cylinder 4 in the working chamber 24 is maintained and the whole surface of the gear shift piston 12 is again loaded by pressure medium, as in the area 36 of the bolt 26 the aperture 30 in the gear shift piston 12 is again sealed. After release of the locking action, the piston 12 moves farther to the right and the aperture 30 in the piston 12 again abandons the area 36 on the bolt 26. Thereby the sealing action is again removed and the pressure medium from the working chamber 24 can again flow into the working chamber 22. This over flowing pressure medium now forms a counter pressure for the gear shift piston 12 in the working chamber 22 so that the gear shift piston 12 cannot impinge with its full dynamics on the end stops and rebound against the selector teeth connected with the gear shift piston 12. With increasing path to the right and increasing diameter of the bolt 26, the aperture 30 is again more and more locked up by the bolt 26 so that in the remaining working chamber 22 a buffer of pressure medium remains and the gear shift piston 12 attenuatedly takes in its right end position in the area 34 of the bolt 26. This end position to the right of the gear shift piston 12 is shown in FIG. 3.

In reverse gear motion the gear shift cycle completes itself accordingly, the working chamber 22 being first loaded with pressure medium and then, during the synchronization, again the aperture 30 on the piston 26 interacts with the area 36 in the bolt 26 to form the sealing point.

REFERENCE NUMERALS 2 gear shift device
4 gear shift cylinder
6 gear shift cylinder sleeve
8 gear shift cylinder cover
10 gear shift rod
12 gear shift piston
14 seal
16 seal
18 flange
20 seal
22 working chamber
24 working chamber
26 bolt
28 aperture
30 aperture
32 area
34 area
36 area

The invention claimed is:

1. A gear shift device (2) for a motor vehicle, the gear shift (2) comprising:
    a single gear shift cylinder (4);
    a single gear shift piston (12) dividing the gear shift cylinder (4) into first and second working chambers (22, 24) and having an axial aperture (30) with an internal diameter extending between the first and the second working chambers (22, 24);
    wherein a single axially fixed bolt (26) extends between the first and the second working chambers (22, 24) through the aperture (30) and has end areas (32, 34) with a first external diameter and a middle area having a smaller external diameter;
    the piston (12) is axially movable from a first end to a second end of the cylinder (4) by a pressure medium applied to one of the first and the second working chambers (22 or 24);
    when the piston (12) is adjacent the first end, the internal diameter of the aperture (30) forms a seal with the first external diameter of the bolt (26) to retain the pressure medium in the one of the first and the second working chambers (22 or 24);
    when the piston (12) is in the bolt (26) middle area, the internal diameter of the aperture (30) and the smaller external diameter of the bolt (26) form a passage between the first and the second working chambers (22, 24) to provide a counter pressure against the piston (12) in the other of the first and the second working chambers (24 or 22); and
    when the piston (12) is adjacent the second end, the internal diameter of the aperture (30) forms a seal with the first external diameter of the bolt (26) to form a pressure medium buffer in the other of the first and the second working chambers (24 or 22).

2. The gear shift device (2) according to claim 1, wherein the middle area further includes a middle sealing area (36) having the first external diameter to form a seal with the aperture (30) to close the passage between the first and the second working chambers (22, 24) and an allow locking motion of the piston (12) at the middle sealing area (36).

3. The gear shift device (2) according to claim 2, wherein the diameter of said bolt (26) continuously decreases from each of the end areas (32, 34) toward middle sealing area (36).

4. The gear shift device (2) according to claim 1, wherein said gear shift piston (12) further includes a second aperture (28) spaced axially from the first aperture (30), and the bolt (26) extends through the second aperture (28).

5. The gear shift device (2) according to claim 2, wherein the first aperture (30) in the piston (12) is located in middle sealing area (36) of the bolt (26) when the gear shift device (2) is in a synchronization phase.

* * * * *